(12) United States Patent
Lee et al.

(10) Patent No.: US 12,518,541 B2
(45) Date of Patent: Jan. 6, 2026

(54) METHOD AND DEVICE FOR DETERMINING AVAILABLE VEHICLE BOARDING AREA IN TRAVEL IMAGE BY USING ARTIFICIAL NEURAL NETWORK

(71) Applicant: 42DOT INC., Seoul (KR)

(72) Inventors: Seung Jae Lee, Hwaseong-si (KR); Aidyn Zhakatayev, Seoul (KR); Seong Gyun Jeong, Seongnam-si (KR)

(73) Assignee: 42DOT INC., Seoul (KR)

( * ) Notice: Subject to any disclaimer, the term of this patent is extended or adjusted under 35 U.S.C. 154(b) by 366 days.

(21) Appl. No.: 18/044,551

(22) PCT Filed: Sep. 8, 2021

(86) PCT No.: PCT/KR2021/012239
§ 371 (c)(1),
(2) Date: Dec. 18, 2023

(87) PCT Pub. No.: WO2022/055260
PCT Pub. Date: Mar. 17, 2022

(65) Prior Publication Data
US 2024/0320981 A1    Sep. 26, 2024

(30) Foreign Application Priority Data
Sep. 8, 2020    (KR) ..................... 10-2020-0114795

(51) Int. Cl.
*G06V 20/56*    (2022.01)
*G06T 7/11*    (2017.01)
*G06V 10/44*    (2022.01)

(52) U.S. Cl.
CPC ............... *G06V 20/56* (2022.01); *G06T 7/11* (2017.01); *G06V 10/44* (2022.01)

(58) Field of Classification Search
CPC ........ G06V 20/56; G06V 10/44; G06V 10/82; G06V 10/764; G06V 10/40; G06T 7/11
(Continued)

(56) References Cited

U.S. PATENT DOCUMENTS 10,176,388 B1 *  1/2019  Ghafarianzadeh ..... G06V 10/94
11,250,054 B1 *  2/2022  Campbell .............. G06V 20/62
(Continued)

FOREIGN PATENT DOCUMENTS

JP    2016-133878 A    7/2016
JP    2019-079149 A    5/2019
(Continued)

OTHER PUBLICATIONS

KR 10-2094341 English translation (Year: 2018).*
KR 2019-0107278 English translation (Year: 2019).*

*Primary Examiner* — Fernando Alcon
(74) *Attorney, Agent, or Firm* — Kilpatrick Townsend & Stockton LLP

(57) ABSTRACT

An embodiment provides an apparatus for determining a vehicle boarding possible area for a driving image using an artificial neural network, including: an image segmentation module that obtains a driving image for a driving direction of a vehicle from a camera module and segments the driving image into a plurality of image strips; a pre-trained boarding availability classification artificial neural network module that uses the image strip as input information and boarding availability information for the image strip as output information; a feature extraction module that extracts an activation map including feature information on the image strip from the boarding availability classification artificial neural network module; and an area information generation module that generates boarding possible area information for the image strip based on the feature information included in the activation map.

5 Claims, 16 Drawing Sheets

(58) Field of Classification Search
CPC .......... G06T 2207/20084; G06N 3/082; G06N 3/09; G06N 3/0464; G06N 3/045; G06N 3/048

See application file for complete search history.

(56) References Cited

U.S. PATENT DOCUMENTS

| | | | |
|---|---|---|---|
| 2018/0204465 A1* | 7/2018 | Tong ..................... | G06N 7/01 |
| 2018/0365835 A1* | 12/2018 | Yan ..................... | G06T 7/143 |
| 2019/0332893 A1* | 10/2019 | Roy Chowdhury ..................... | |
| | | | G06F 18/2163 |
| 2020/0056892 A1* | 2/2020 | Haque ..................... | G01C 21/28 |
| 2020/0089974 A1* | 3/2020 | Ding ..................... | G06V 10/82 |
| 2022/0108478 A1* | 4/2022 | Houlsby ................. | G06N 3/08 |
| 2022/0114807 A1* | 4/2022 | Iancu .................... | G06V 20/58 |
| 2023/0119634 A1* | 4/2023 | Kabkab .............. | G06F 18/2431 |
| | | | 382/103 |
| 2024/0371179 A1* | 11/2024 | Winkler .............. | G06V 10/764 |

FOREIGN PATENT DOCUMENTS

| | | |
|---|---|---|
| KR | 20190067680 A | 6/2019 |
| KR | 20190107278 A | 9/2019 |
| KR | 102043142 B1 | 11/2019 |
| KR | 102094341 B1 | 3/2020 |

* cited by examiner (a)

(b)

(c)

METHOD AND DEVICE FOR DETERMINING AVAILABLE VEHICLE BOARDING AREA IN TRAVEL IMAGE BY USING ARTIFICIAL NEURAL NETWORK

TECHNICAL FIELD

The present invention relates to a method and apparatus for determining a vehicle boarding possible area for a driving image using an artificial neural network, and more specifically, to a technology in which the vehicle driving image is classified into a boarding possible area and a boarding impossible area by using the artificial neural network and then boarding possible area information is provided to a driver.

BACKGROUND

Generally, between a roadway for vehicles and a sidewalk for pedestrians, there are an area in which a pedestrian on the sidewalk can get in a vehicle without any obstacles and an area in which structures such as fences or trees exist to prevent accidents and pedestrians can get in the vehicle. Therefore, when a user calls a call taxi to get in a taxi or gents in a vehicle of an acquaintance for using the vehicle, in selecting an area in which it is possible to get in the vehicle, many problems occur when geographic information of the area is not accurately known.

In addition, when a driver tries to stop a vehicle in a road adjacent to a sidewalk for an acquaintance to get in the vehicle, and when the driver does not exactly know in advance a location at which the acquaintance can get into the vehicle, the driver may have problems hovering around to find a boarding possible area, and an accident may occur while forcibly stopping the vehicle on a road to pick up an acquaintance in a location that is not in a boarding possible area.

Therefore, when a driver who drives a vehicle or a pedestrian who intends to get in the vehicle can know in advance a vehicle-boarding possible location, the problems described above may not occur, but there is still no technology that provides information on an area where a pedestrian can safely board in a driving lane to a driver or provides information on a boarding possible area in a surrounding area to a pedestrian

SUMMARY OF INVENTION

Technical Objects

Accordingly, a method and an apparatus for determining a vehicle boarding possible area for a driving image using an artificial neural network according to an embodiment, as an invention devised to solve the above-described problems, are an invention about a technology that provides information on the area where a pedestrian can get in a vehicle by using an artificial neural network.

More specifically, by generating information on a boarding possible area by using an artificial neural network module for information on a vehicle driving image that is inputted, and by displaying the information on the generated boarding possible area on the vehicle driving image or providing information mapped on a map to a driver or pedestrian, there is a purpose to allow the pedestrian to board a vehicle more safely.

In addition, by providing a user with map information in which a result of analyzing a boarding possible area for a previously taken driving image is mapped to a map, there is a purpose to make it possible to call a taxi more accurately based on an available area when calling a taxi, or to allow an acquaintance and a driver to share a boarding possible location in advance when boarding the acquaintance in a vehicle.

In addition, by providing information on a boarding possible area automatically generated based on a driving image, it is possible to more easily generate a map including the information on the boarding possible area.

An embodiment provides an apparatus for determining a vehicle boarding possible area for a driving image using a artificial neural network, including: an image segmentation module that obtains a driving image for a driving direction of a vehicle from a camera module and segments the driving image into a plurality of image strips: a pre-trained boarding availability classification artificial neural network module that uses the image strip as input information and boarding availability information for the image strip as output information: a feature extraction module that extracts an activation map including feature information on the image strip from the boarding availability classification artificial neural network module; and an area information generation module that generates boarding possible area information for the image strip based on the feature information included in the activation map.

The apparatus for determining the vehicle boarding possible area for the driving image using the artificial neural network may further comprise a pre-trained segmentation artificial neural network module that uses the image strip as input information and image segmentation information on the image strip as output information, wherein the area information generation module generates boarding possible area information for the image strip based on the activation map and the image segmentation information.

The area information generation module may generate a corrected activation map by utilizing reliability information for each coordinate included in the image segmentation information based on a representative point of the activation map, and generates boarding possible area information for the image strip based on the corrected activation map.

A loss of the segmentation artificial neural network module may include a representative point loss that is a distance difference between representative point information in reference information for the image strip and representative point information in the image segmentation information, and a boundary line loss that is a distance difference between boundary line information in reference information for the image strip and boundary line information in the image segmentation information, and the segmentation artificial neural network module may perform training so as to reduce a loss of the segmentation artificial neural network module.

The image segmentation module may segment the driving image so that the image strip becomes a rectangular image strip having a vertical length thereof to be longer than a horizontal length thereof.

An embodiment provides a method for determining a vehicle boarding possible area for a driving image using an artificial neural network may comprise obtaining a driving image for a driving direction of a vehicle from a camera module, and segmenting the driving image into a plurality of image strips, extracting an activation map including feature information in the image strip, from a pre-trained boarding availability classification artificial neural network module that uses the image strip as input information and boarding availability information for the image strip as output information and generating boarding possible area information for the image strip based on the feature information included in the activation map.

Effects of the Invention

Since the method and apparatus for determining the vehicle boarding possible area for the driving image using the artificial neural network according to the embodiment provides information on a vehicle boarding possible area on a current road to a driver of a vehicle or a pedestrian, the pedestrian can safely board the vehicle.

In addition, in providing information on a vehicle boarding possible area, in the prior art, it is manually performed by a person, while in the present invention, information on a boarding possible area in front of a currently driving vehicle can be generated in an automated manner by using an artificial neural network, so that it is possible to more safely and accurately provide boarding possible area information.

In addition, it is possible to accurately know a location of the boarding possible area according to this, so that a waiting time for a call taxi service may be remarkably reduced.

In addition, when a map including boarding possible area information is created, in the prior art, it is necessary to manually label a boarding possible area on the map, while in the present invention, it is possible to automatically create boarding possible area information based on an obtained driving image, so that it is possible to more easily create a map including the boarding possible area information.

DETAILED DESCRIPTION OF EMBODIMENTS

Figure 1:
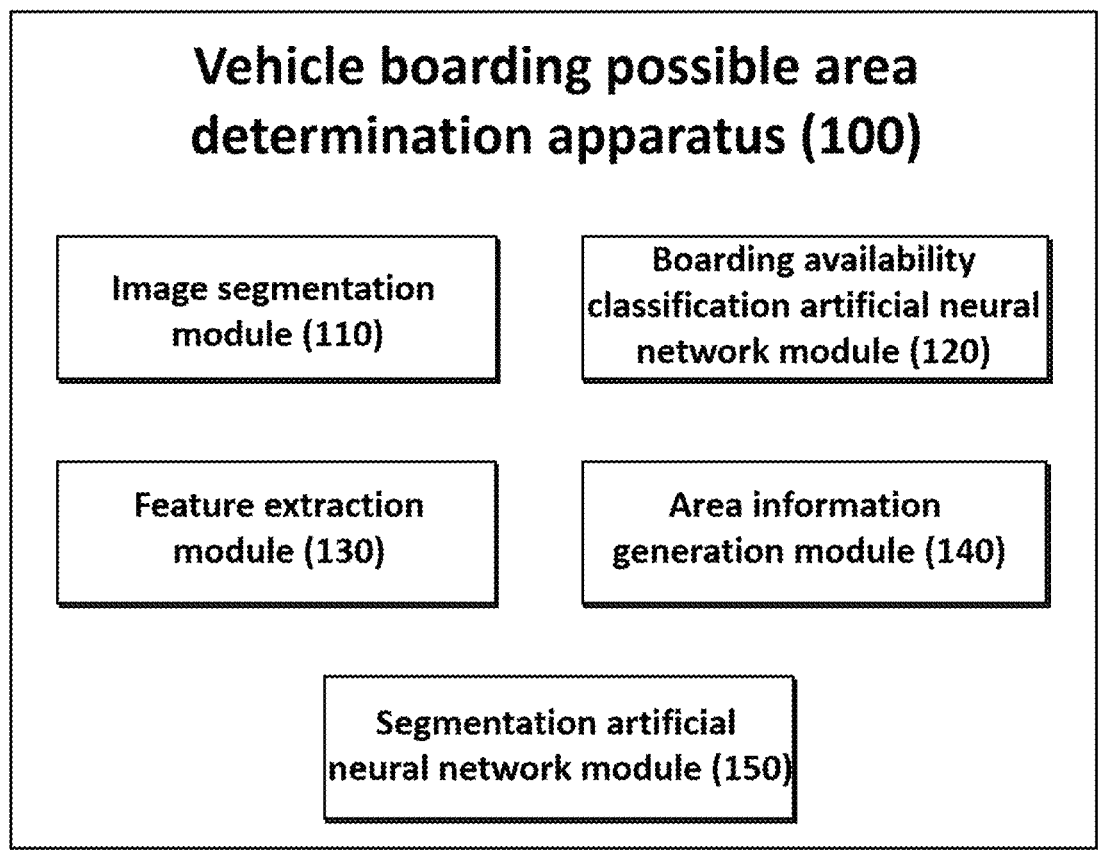
FIG. 1 illustrates a block diagram illustrating some constituent elements of an apparatus for determining a vehicle boarding possible area for a driving image using an artificial neural network according to an embodiment of the present invention

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below; but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

Figure 2:
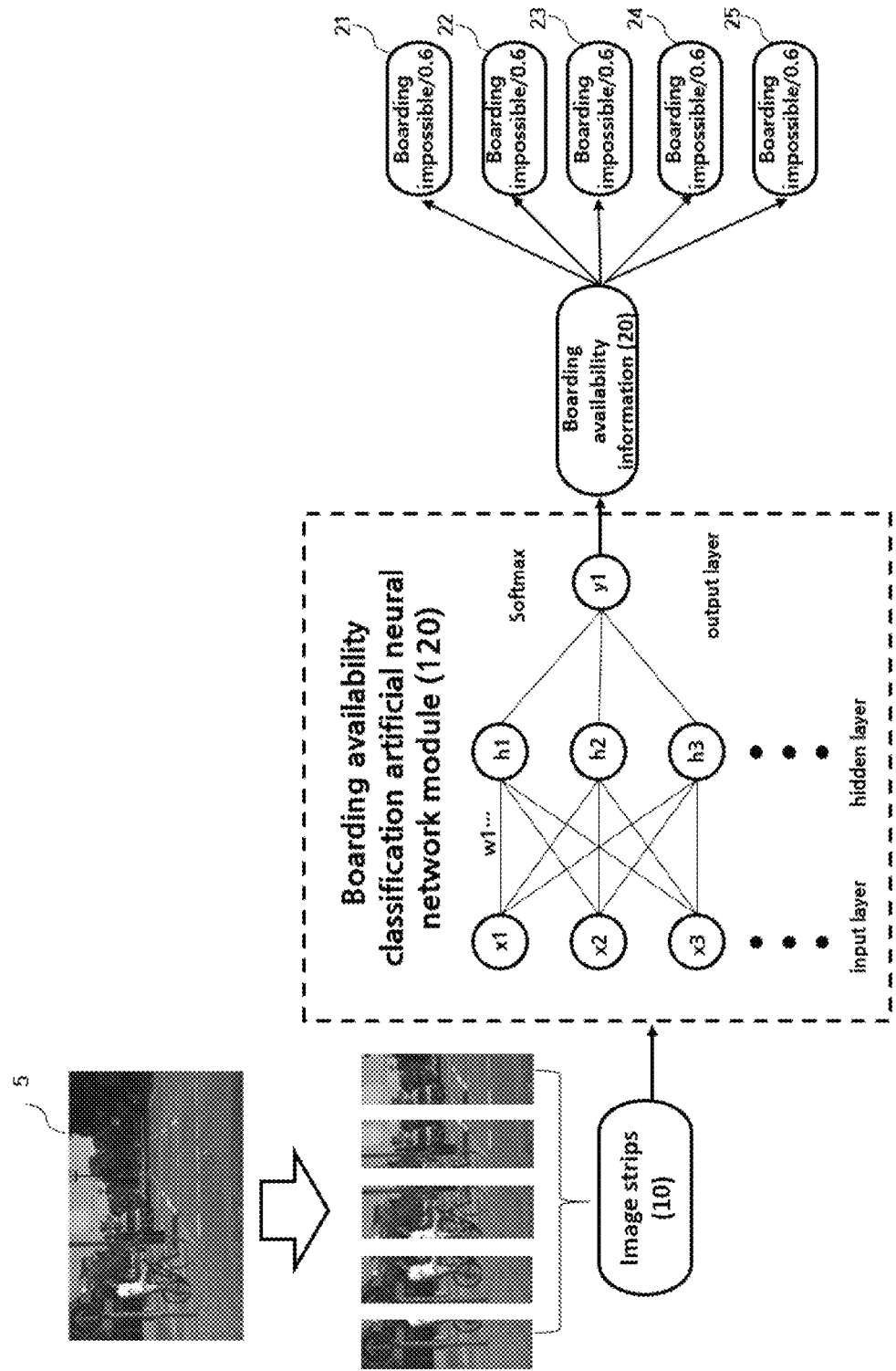
FIG. 2 illustrates input information inputted to an artificial neural network module for classifying boarding availability according to an embodiment and output information outputted therefrom

FIG. 1 illustrates a block diagram illustrating some constituent elements of an apparatus 100 for determining a vehicle boarding possible area for a driving image using an artificial neural network according to an embodiment of the present invention, and FIG. 2 illustrates input information inputted to an artificial neural network module for classifying boarding availability according to an embodiment and output information outputted therefrom. Hereinafter, for convenience of description, the apparatus 100 for determining the vehicle boarding possible area for the driving image using the artificial neural network will be referred to as a vehicle boarding possible area determination apparatus 100 and described.

Referring to FIG. 1, the vehicle boarding possible area determination device 100 may include an image segmentation module 110, a boarding availability classification artificial neural network module 120, a feature extraction module 130, an area information generation module 140, and a segmentation artificial neural network module 150.

The image segmentation module 110 collects driving images 5 of a front and side of a vehicle photographed through a camera, segments the collected driving images 5 into a plurality of image strips 10, and then transmits a plurality of the segmented image strips 10 to the boarding availability classification artificial neural network module 120.

Specifically, the driving image 5 is segmented into the plurality of image strips 10 having a predetermined size, and the plurality of image strips 10 may be segmented into a plurality of image strips 10 sharing an overlapping area with each other as shown in FIG. 2. Conversely, they may be segmented into a plurality of image strips 10 so that no overlapping area exists.

In addition, when the image segmentation module 110 segments the driving image 5 to generate the plurality of image strips 10, the image strip 10 may be generated to have a rectangular shape in which a vertical length thereof is longer than a horizontal length thereof.

In general, as for obstacles that affect pedestrians' boarding of a vehicle, obstacles with long horizontal length (eg, flower beds) have more influence than obstacles with long vertical length (eg, electric poles), so it is possible to accurately generate boarding availability information only by accurately analyzing information on the horizontal length. Accordingly, when the image segmentation module 110 of the present invention generates the plurality of image strips 10, the vertical length of the image strips 10 is segmented to have a longer length than that of the horizontal length, so that it is possible to more effectively determine the vehicle boarding possible area of the pedestrian. A detailed description thereof will be provided again later.

The boarding availability classification artificial neural network module 120 is an artificial neural network module that uses the plurality of image strips 10 transmitted by the image segmentation module 110 as input information, and uses boarding availability information 20 as output information for each image strip, and the boarding availability classification artificial neural network module 120 may include a training session 121 for performing training based on the input information and the output information, and an inference session 122 for inferring output information based on input information. Here, the classification means a class generally referred to in the artificial neural network module.

The training session 121 of the boarding availability classification artificial neural network module 120 is a session in which training may be performed based on input information and output information, and the inference session 122 may analyze the image strip 10 inputted in real time by using an artificial neural network module, and then may output the boarding availability information 20 including information on whether there is a boarding possible area for each image and reliability information thereon as output information.

For example, as shown in FIG. 2, when five images that are sequentially or simultaneously inputted are inputted to the boarding availability classification artificial neural network module 120, whether there are respective boarding possible areas for a total of five images and reliability information therefor may be outputted.

For example, the boarding availability classification artificial neural network module 120 may output information about existence of the boarding possible area and reliability 0.6 as first output information 21 for a first image, may output information about the existence of the boarding possible area and reliability 0.7 as second output information 22 for a second image, may output information about the existence of the boarding possible area and reliability 0.9 as third output information 23 for a third image, may output information about existence of the boarding impossible area and reliability 0.7 as fourth output information 24 for a fourth image, and may output information about the existence of the boarding impossible area and reliability 0.6 as fifth output information 25 for a fifth image.

In addition, FIG. 2 illustrates the case in which class information outputted by the boarding availability classification artificial neural network module 120 is outputted together with boarding classification information and non-boarding classification information, but the present invention is not limited thereto, and the boarding availability classification artificial neural network module 120 may output only the boarding classification information, and conversely, may output only the non-boarding classification information. On the other hand, the specific process of the boarding availability classification artificial neural network module 120 and the structure of the artificial neural network module may utilize a conventionally known image classification artificial neural network module.

The feature extraction module 130 is a module that uses, as output information, an activation map 30 including feature information for the image strip 10. With respect to the feature extraction module 130, FIG. 3 illustrates a relationship between the boarding availability classification artificial neural network module 120 and the feature extraction module 130 according to an embodiment of the present invention, and FIG. 4 illustrates the activation map extracted by the feature extraction module 130 for the image strip that is input information.

Figure 3:
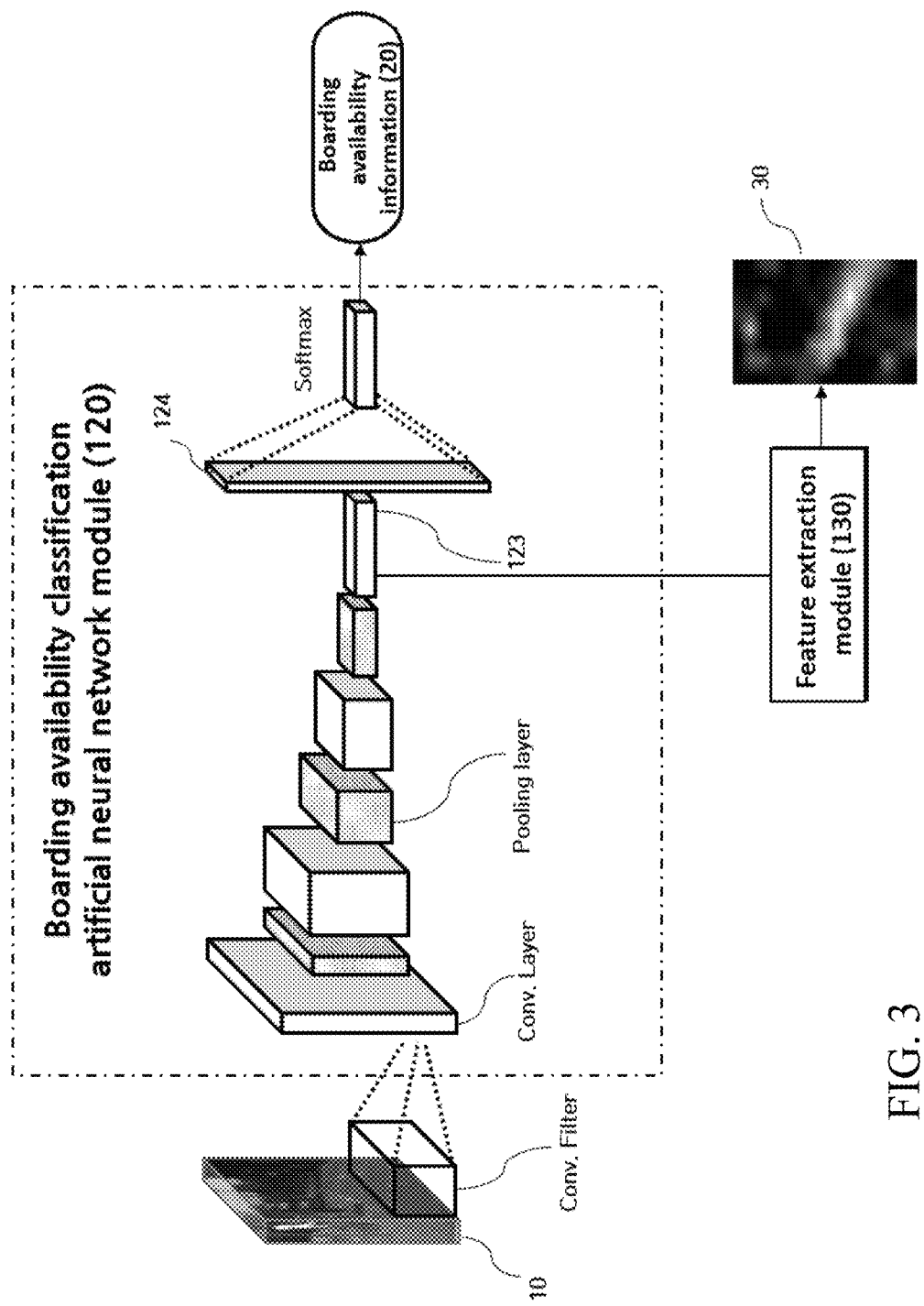
FIG. 3 illustrates a relationship between the boarding availability classification artificial neural network module and the feature extraction module according to an embodiment of the present invention.

As shown in FIG. 3, the feature extraction module 130 means a module that outputs the activation map 30 that includes a fully connected layer (124) in a pre-trained image classification artificial neural network including ConvNet and feature information in a layer 123 before an output layer.

Specifically, the feature extraction module 130 may analyze the input image strip 10 to extract the activation map 30 including information about an area in which objects in the image exist and an area in which no object therein exists. Since the boarding availability classification neural network module 120 corresponds to an artificial neural network module that outputs the boarding availability information 20 with respect to the inputted image as described above, the information inputted to the layer 123 before the output includes information on whether boarding is possible for each area with respect to the image inputted to the boarding availability classification artificial neural network module 120. Accordingly, the feature extraction module 130 may extract the activation map 30 including the boarding availability information for each area by applying previously known various filters to the layer 123 before the output.

Figure 4:
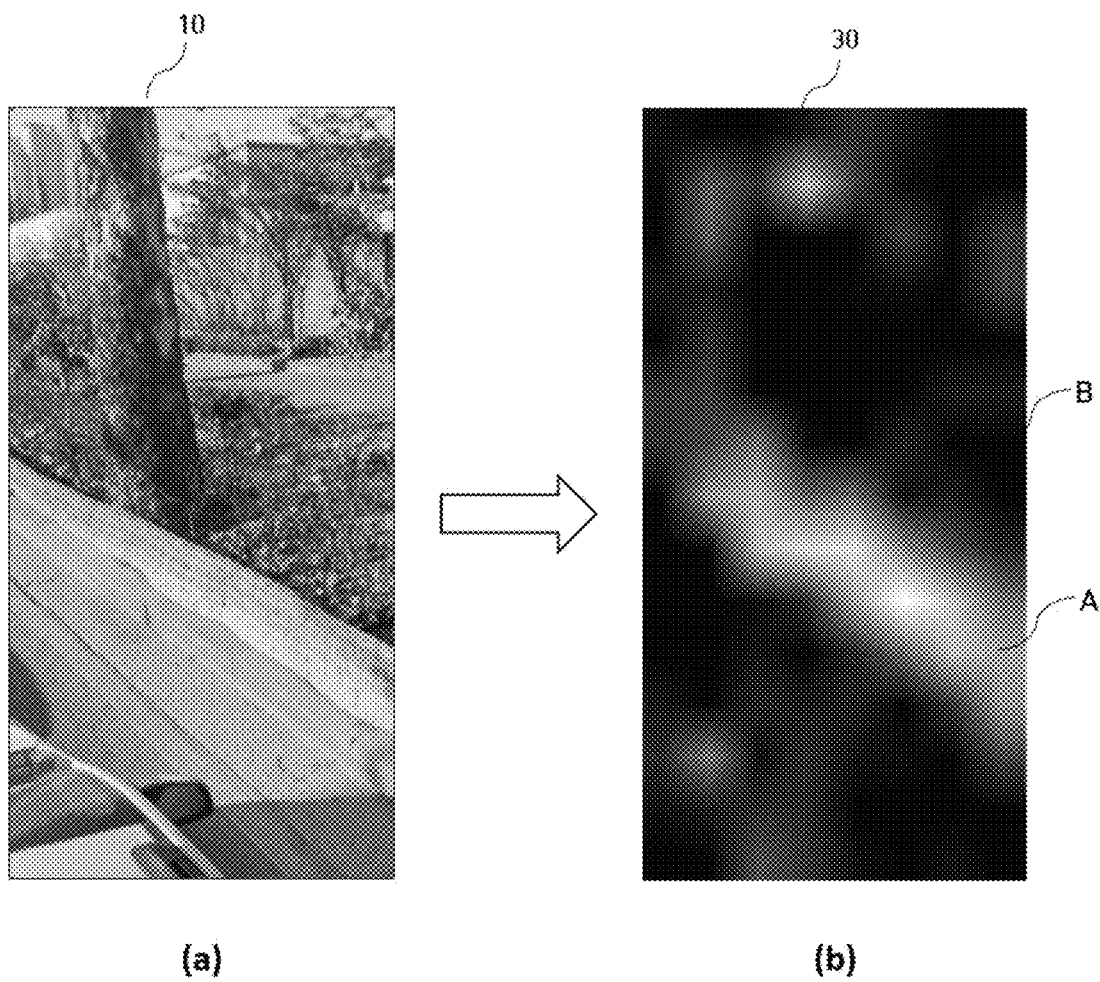
FIG. 4 illustrates the activation map extracted by the feature extraction module 130 for the image strip that is input information.

For example, when the image shown in (a) of FIG. 4 as the image strip 10 is inputted to the boarding availability classification artificial neural network module 120, the feature extraction module 130 may extract the activation map 30 such as the image shown in (b) FIG. 4 from the fully connected layer 124 and the layer 123 before the output layer.

In (b) of FIG. 4, a white portion means a portion determined to be a boarding possible area, and a black portion means an area where boarding is not possible, and this information may be referred to as feature information. That is, in extracting the activation map 30 by applying the filter in the layer 123 before the output, the feature extraction module 130 may display probability information for each area based on probability information on whether boarding is possible based on the information inputted to the layer 123 before the output, that is, may segment it into the white area and the black area as shown in (b) of FIG. 4 to display it.

Furthermore, the feature extraction module 130 may display only an area having a probability of a predetermined standard or more in white based on vector information and probability information including location information for each area, while may display areas having other probabilities in black.

The area information generation module 140 may generate the boarding possible area information for the image strip 10 based on the feature information included in the activation map 30.

Figure 5:
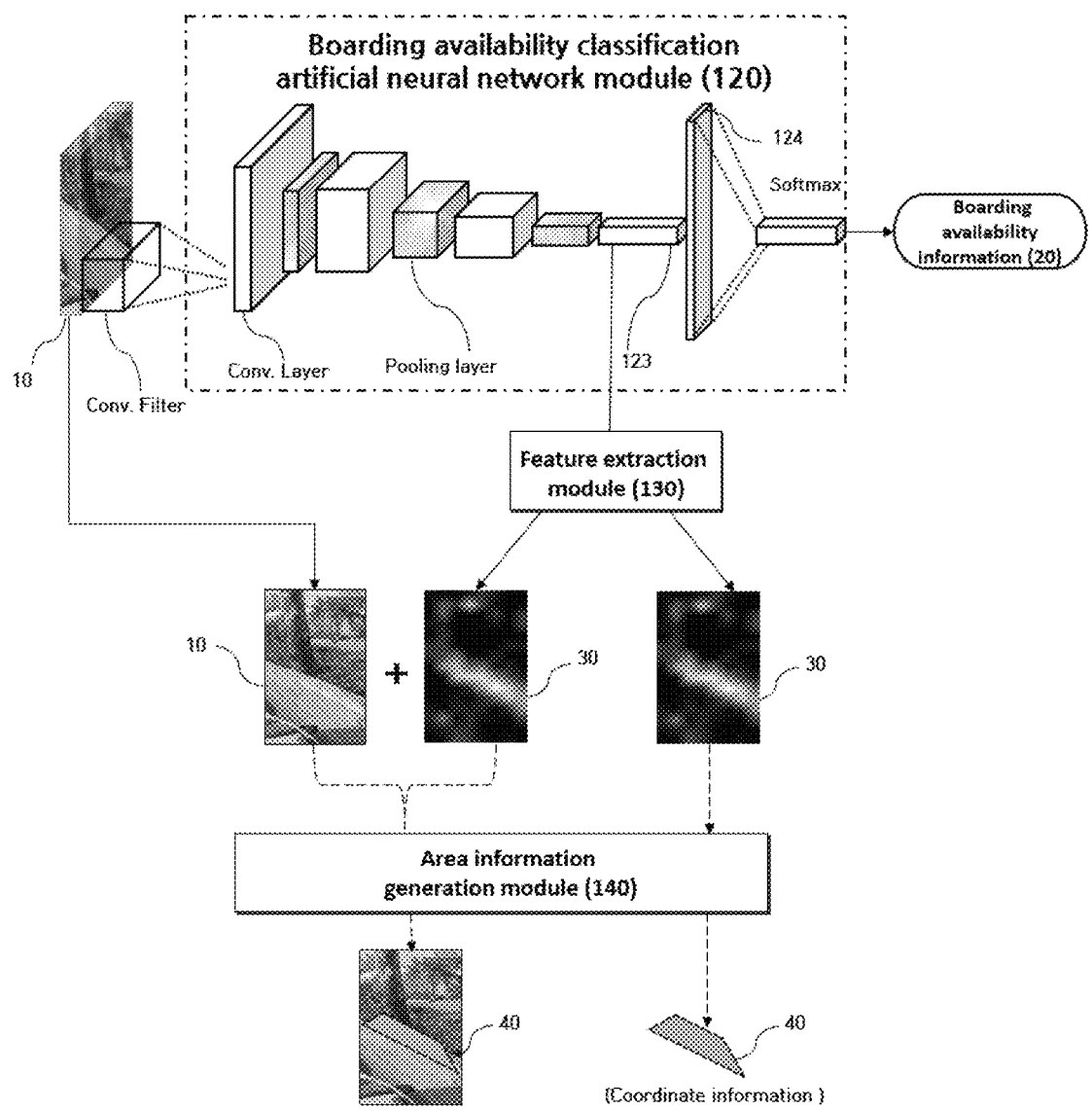
FIG. 5 illustrates a relationship between the boarding availability classification artificial neural network module, the feature extraction module, and the area information generation module according to the embodiment of the present invention.

FIG. 5 illustrates a relationship between the boarding availability classification artificial neural network module 120, the feature extraction module 130, and the area information generation module 140 according to the embodiment of the present invention.

Specifically, as shown in FIG. 5, the area information generation module 140 may generate boarding possible area information 40 based on an area for an obstacle included in the activation map 30 extracted by the feature extraction module 130 and feature information for an area not including the area. As described above, since the activation map 30 extracted by using the filter includes coordinate information for each area and information on whether boarding is possible as vector information, the boarding possible area may be determined based on such information of the area information generation module 140.

Specifically, the area information generation module 140 may generate the boarding possible area information 40 based on the information on the white area and the black area shown in (b) FIG. 4. As mentioned above, since the white area is an area without obstacles and the black color area is an area with obstacles, it is possible to generate the boarding possible area information 40 based on the white area. However, because the white area without obstacles does not mean that passengers can unconditionally get in the vehicle, the area information generation module 140 may generate the vehicle boarding possible area information 40, based on information on whether the white area is formed with a predetermined size or more that a person can move, information on whether it is connected to the ground, and information on whether the white area is connected to a vehicle, and such boarding possible area information 40 may include as coordinate information and generated.

Therefore, the area information generation module 140 generates image information based on the boarding possible area information 40 having coordinate information about boarding possible, and then it may display such image information as a separate area on the image strip 10 inputted to the boarding availability classification neural network module 120. When the boarding possible area information 40 is segmented into a separate area and displayed on the image strip 10, it is possible for the driver or passenger to intuitively know the boarding possible area possible.

In addition, after the area information generation module 140 generates the boarding possible area information 40, the area information generation module 140 may display it in a manner in which the boarding possible area possible information 40 overlaps the image strips 10 as shown in the lower left of FIG. 5, or may generate the boarding possible area information 40 as coordinate information as shown in the lower right of FIG. 5. The coordinate information means coordinate information for the boarding possible area within the image strip 10, and the coordinate information may be used as information to which the boarding possible area may be mapped on the map together with the location information in the driving image. Accordingly, when the boarding possible area information 40 is generated as coordinate information as in the present invention, in mapping the boarding possible area on the map, it may be more easily mapped.

In addition, the area information generation module 140 may also generate the boarding possible area information 40 based on image segmentation information 50 outputted from the segmentation artificial neural network module 150. Hereinafter, the segmentation artificial neural network module 150 will be described in detail.

Figure 6:
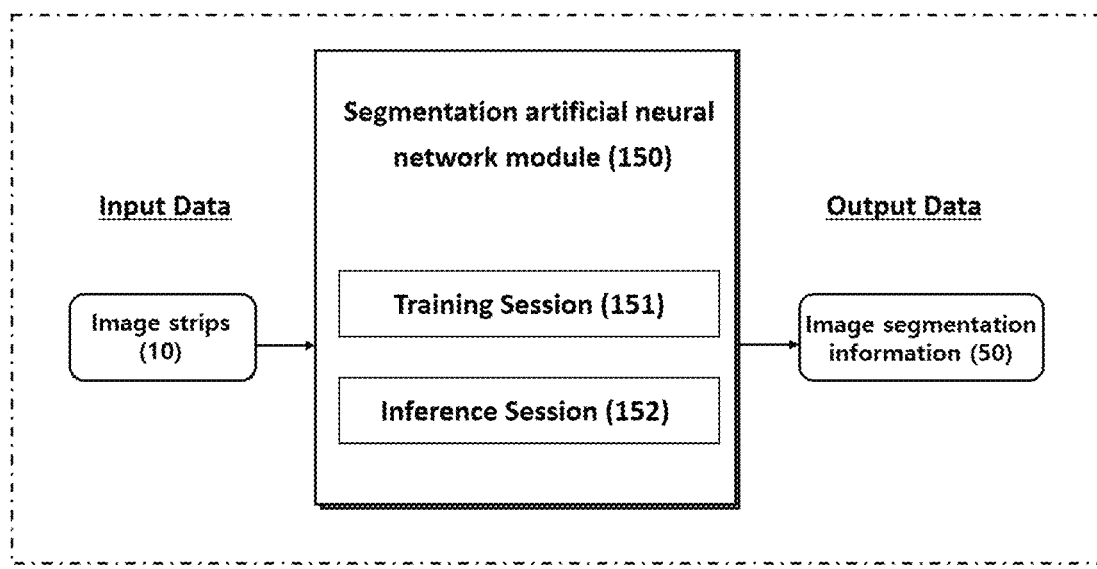
FIG. 6 and FIG. 7 illustrate input information inputted to the segmentation artificial neural network module and output information outputted therefrom according to an embodiment.
Figure 7:
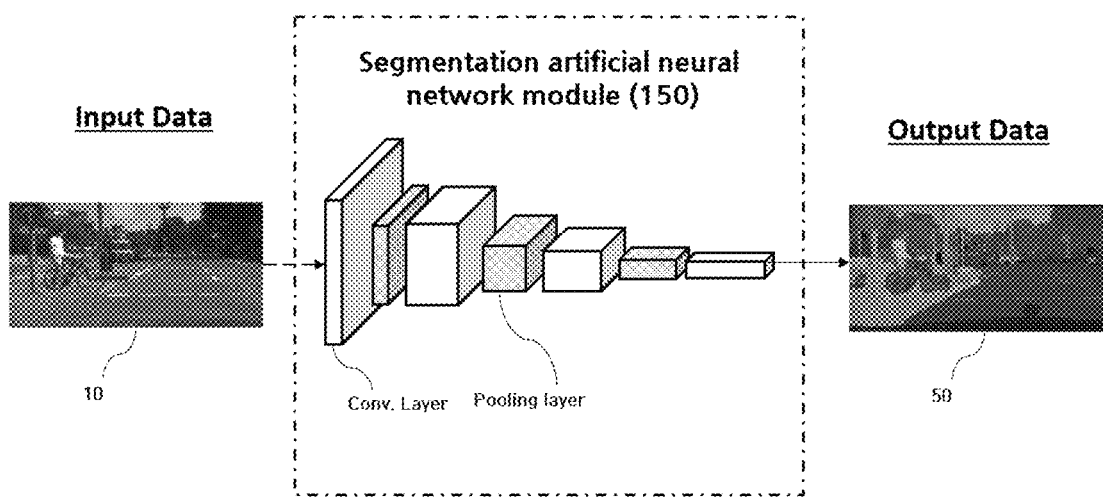

FIG. 6 and FIG. 7 illustrate input information inputted to the segmentation artificial neural network module and output information outputted therefrom according to an embodiment.

The segmentation artificial neural network module 150 is an artificial neural network module that uses the plurality of image strips 10 transmitted by the image segmentation module 110 as input information, and uses the image segmentation information 50 as output information for each image strip, and the segmentation artificial neural network module 150 may include a training session 151 for performing training based on the input information and the output information, and an inference session 152 for inferring output information based on input information.

Here, the image segmentation information 50 refers to an image in which an image is segmented into a plurality of pixel sets, and refers to information segmented into several groups by grouping coordinates having the same or similar feature for each coordinate. Generally, an area in which the same image is displayed means an area in which predetermined features such as color, brightness, and material are similar, and an area in which different images are displayed means an area in which the features are different from each other.

The training session 151 of the segmentation artificial neural network module 150 is a session in which training may be performed based on input information and output information, and the inference session 152 may analyze the image strip 10 inputted in real time by using the artificial neural network module to infer the image segmentation information 50 including classification information that classifies objects present in each image.

Accordingly, when an image including a roadway, a sidewalk, a pedestrian, a tree, and the like as shown in FIG. 7 is input to the segmentation artificial neural network module 150 as input information, the image segmentation information 50 displayed by grouping different images with respect to a roadway, a sidewalk, a pedestrian, a tree, and the like may be output as output information.

Accordingly, the segmentation artificial neural network module 150 may include an artificial neural network capable of outputting image segmentation information for an input image, and representatively, a CNN neural network may be used. When the segmentation artificial neural network module 150 according to the present invention is an artificial neural network capable of outputting the image segmentation information 50 described above for an input image, it may be any known artificial neural network.

In the present specification, as an neural network applied to the segmentation artificial neural network module 150 of the present invention, it has been described based on a CNN, but the neural network applied to the segmentation artificial neural network module 150 of the present invention is not limited to the CNN, and various well-known artificial neural network models such as Google Mobile Net v2, VGGNet16, and ResNet50 useful for image detection may be applied, and artificial neural networks such as CNN, Google Mobile Net v2, VGGNet16, and ResNet50 may also be used in the above-described boarding availability classification artificial neural network module 120.

Figure 8:
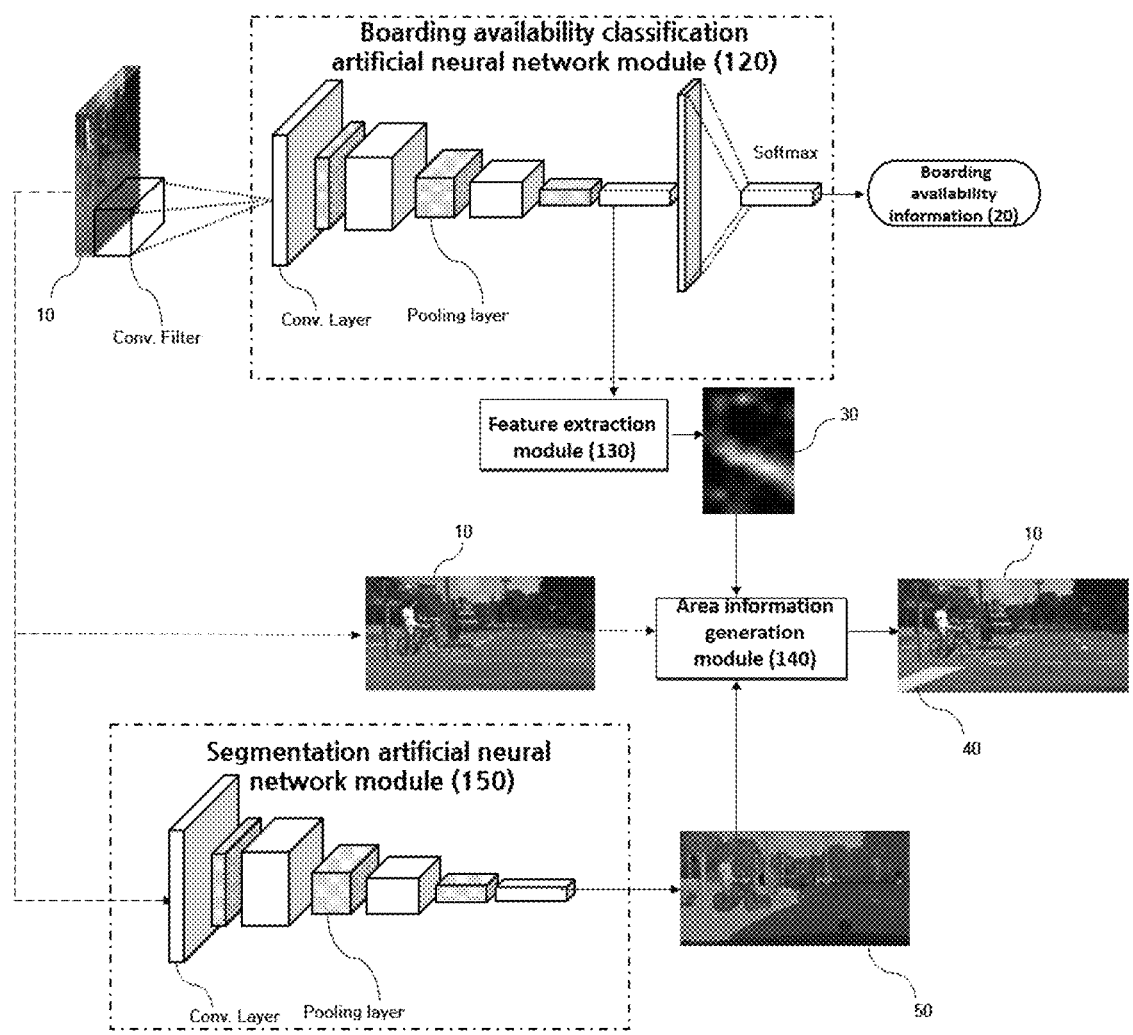
FIG. 8 illustrates a relationship between the boarding availability classification artificial neural network module, the feature extraction module, the area information generation module, and the segmentation artificial neural network module according to the embodiment.

FIG. 8 illustrates a relationship between the boarding availability classification artificial neural network module, the feature extraction module, the area information generation module, and the segmentation artificial neural network module according to the embodiment.

As shown in FIG. 8, the area information generation module 140 may determine the boarding possible area by using the image segmentation information 50 for the activation map 30 extracted by the feature extraction module 130, and may display the determined boarding possible area information 40 as a separate area on the image strip 10.

In order for the boarding possible area information to be outputted as accurately as possible, the feature information, which is information about the obstacles determined in the activation map 30 and other information, must be accurate. Accordingly, the area information generation module 140 may increase the accuracy of the feature information based on the information grouped for each area outputted from the segmentation artificial neural network module 150.

Specifically, the area information generation module 140, based on the image segmentation information 50 outputted from the segmentation artificial neural network module 150 and reliability information therefor, may generate a corrected activation map in which segmentation correction is performed on the activation map 30, and may determine the boarding possible area based on the generated corrected activation map.

As described above, the segmentation artificial neural network module 150 outputs clustered information about specific objects, respectively, and since the outputted information is clustered and output in different images, this information includes information on whether an obstacle exists in each zone. Accordingly, the area information generation module 140 corrects the activation map based on the clustered information for each area outputted from the segmentation artificial neural network module 150, and thus, an activation map including information on the existence of obstacles and boarding possible areas for each area may be more accurately generated. Hereinafter, a method for generating the activation map will be described in detail.

Figure 9:
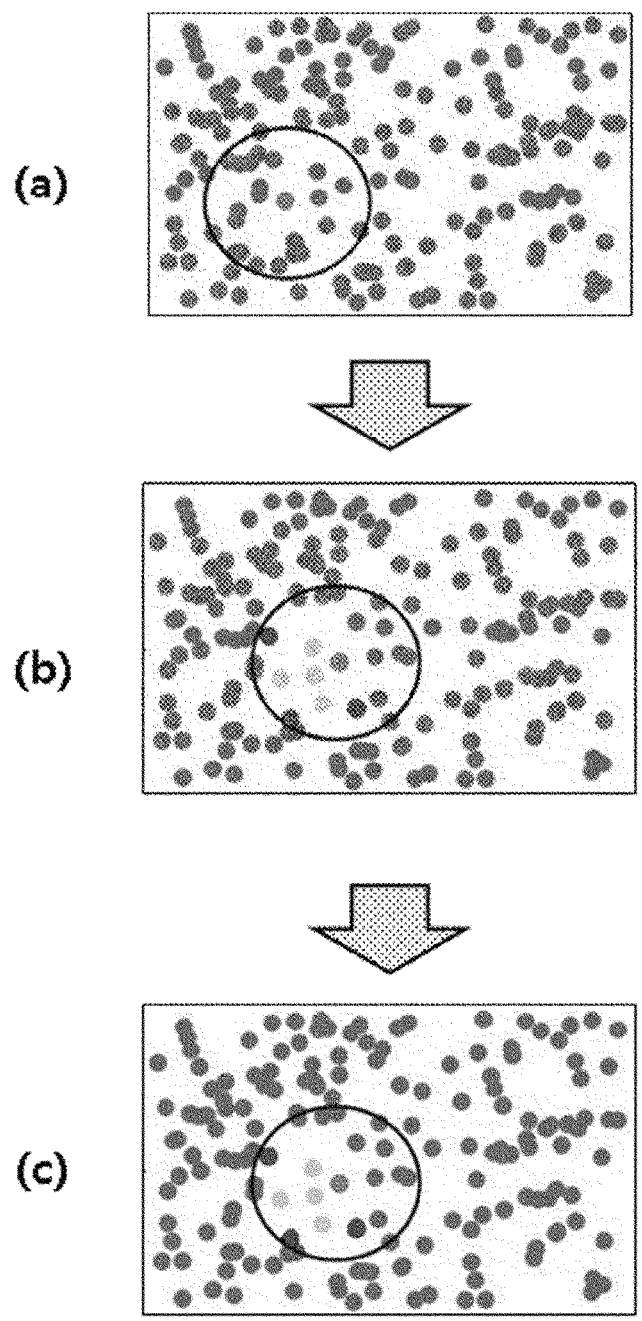
FIG. 9 is a drawing for explaining a principle that the area information generation module corrects an area by using reliability information for each coordinate according to an embodiment.

A segmentation correction process for the activation map will be described with reference to FIG. 9 and FIG. 10. FIG. 9 is a drawing for explaining a principle that the area information generation module corrects an area by using reliability information for each coordinate according to an embodiment, and FIG. 10 is a drawing for explaining a process in which the principle described in FIG. 9 is applied to the present invention.

Figure 10:
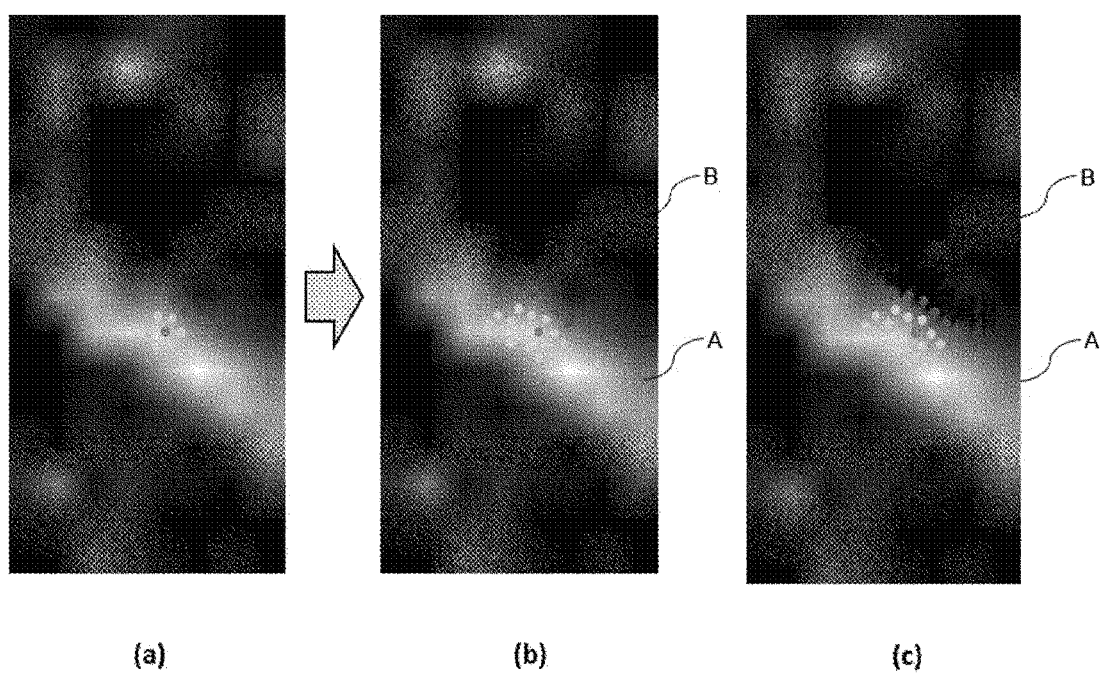
FIG. 10 is a drawing for explaining a process in which the principle described in FIG. 9 is applied to the present invention.

The segmentation means classifying into the same area when it is determined to be the same group by determining the relationship with the surrounding area based on the feature point as described above, and classifying into a different area when it is not, and generally, as shown in (a) of FIG. 10, after determining a representative point (red dot) on the activation map, clustering is performed based on the red dot.

Generally, the clustering is performed while determining the relationship between the representative point and the surrounding area from the representative point, which is the starting point, and in the case of the prior art, it is common to determine whether or not it belongs to the same classification group based on the RGB (red, green, blue) values with the surrounding area. However, the area information generation module 140 according to the present invention is characterized in that it performs a segmentation correction process based on the reliability information for each coordinate included in the image segmentation information 50 unlike the prior art.

Specifically, the area information generation module 140, based on the representative point of the activation map 30, when the reliability value in the image segmentation information 50 for the area around the representative point is higher than a predetermined value, expands its range by grouping the area into the same classification group as the representative point. However, when the reliability value in the image segmentation information 50 for the area around the representative point is lower than a predetermined value, the area is determined as a classification group different from the representative point and the range is not expanded. Accordingly, the yellow dots shown in (b) and (c) of FIG. 10 are determined to be in a high reliability area based on the representative red dot and are displayed as the same classification group (A), and the purple dots are determined to be in a low reliability area based on the representative point and are displayed as a different classification group (B).

When this method is applied to the activation map 30 as shown in FIG. 10, the points indicated in yellow in FIG. 10 are classified into the same classification group (A) as the representative point, so that they are areas that do not affect the activation map 30, while the portion indicated by the purple dot is an area classified into the same area as the representative point in the activation map extracted by the feature extraction module 130, but is an area determined as the different classification group (B) when classified based on the image segmentation information 50, so that correction for this portion is necessary based on the image segmentation information 50.

Accordingly, the area information generation module 140 may generate a corrected activation map in which an area for the purple dots is corrected to a black area instead of a white area as shown in (c) of FIG. 10, may determine the boarding possible area based on this, and display the boarding possible area information 40 on the image strip 10 as shown in FIG. 8.

That is, the area information generation module 140 according to the embodiment uses the reliability information included in the image segmentation information 50 to increase the accuracy of the activation map including the feature information, and then, based on this, it generates the boarding possible area information, thereby more accurately generating the boarding possible area information.

In addition, since the corrected activation map is generated based on the image segmentation information 50 output from the segmentation artificial neural network module 150, as the segmentation artificial neural network module 150 is well-trained, the reliability of the boarding possible area information may be increased. Accordingly, the segmentation artificial neural network module 150 may perform training by using reference information 60. Hereinafter, this will be described with reference to FIG. 12 and FIG. 13.

Figure 11:
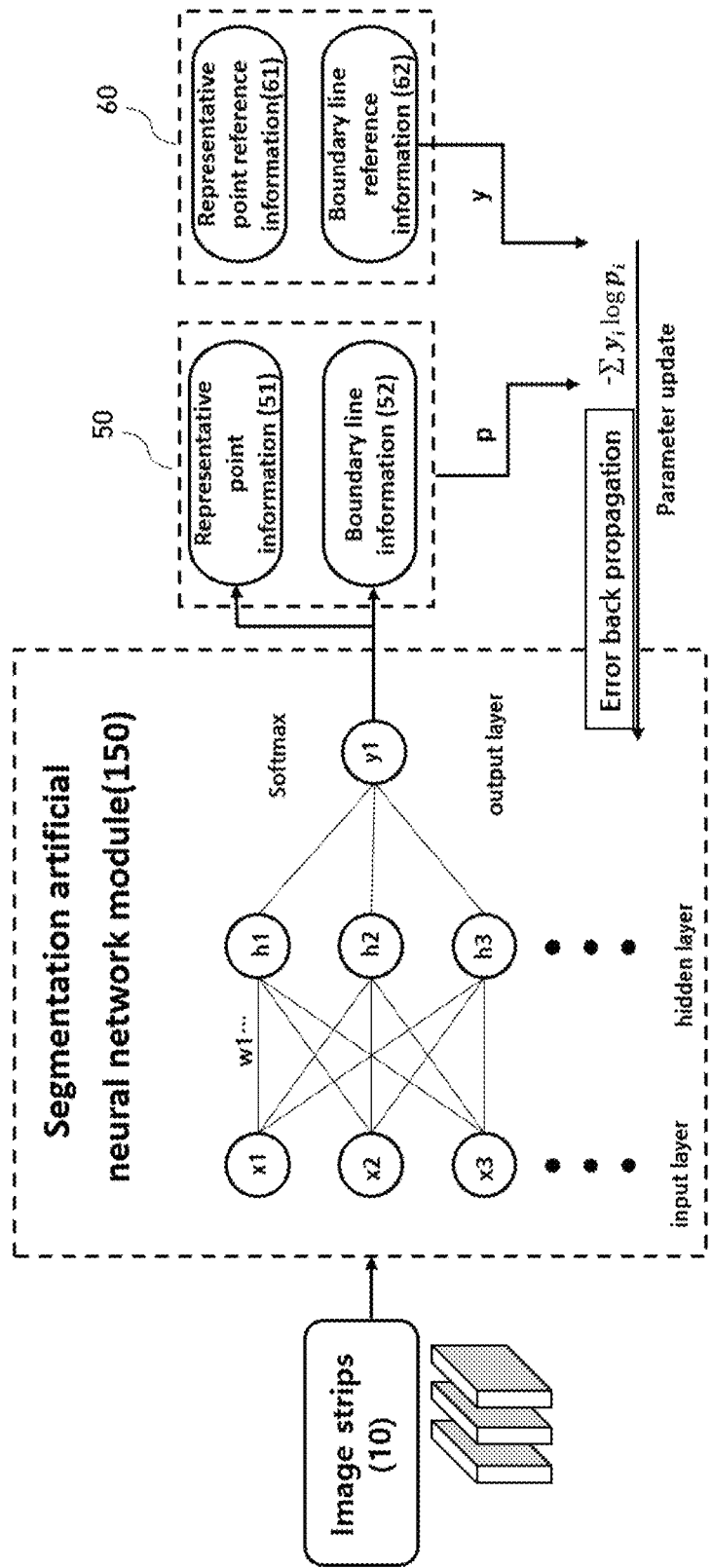
FIG. 11 is a drawing for explaining a method in which the segmentation artificial neural network module performs training, according to an embodiment.
Figure 12:
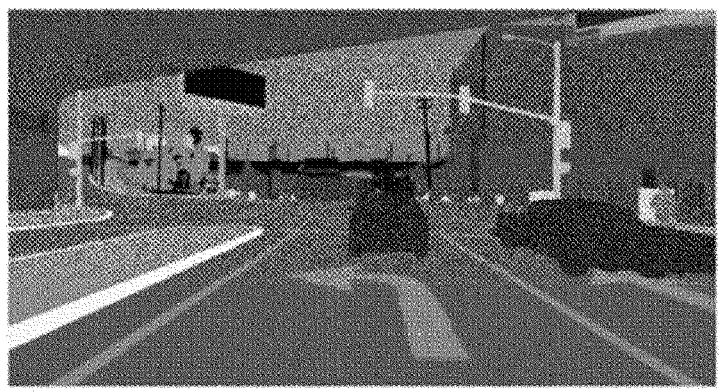
FIG. 12 is a drawing for explaining a method in which the segmentation artificial neural network module performs training by using output information and reference information according to an embodiment.
Figure 12:
Figure 12:
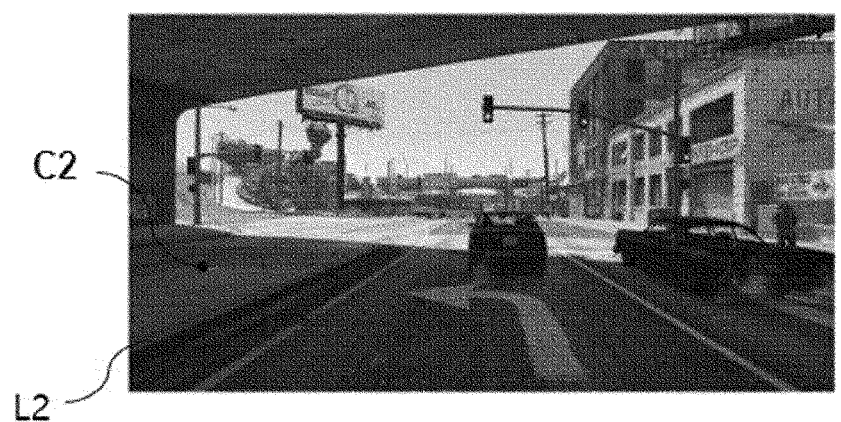

FIG. 11 is a drawing for explaining a method in which the segmentation artificial neural network module 150 performs training, according to an embodiment, and FIG. 12 is a drawing for explaining a method in which the segmentation artificial neural network module performs training by using output information and reference information according to an embodiment.

Referring to FIG. 11, the segmentation artificial neural network module 150 may configure a loss function to update a parameter of the segmentation artificial neural network module 150 so that a difference between output information and reference information is reduced, by using the image strip 10 as input information, by using the image segmentation information 50 including representative point information 51 and boundary line information 52 as output information, and by using the reference information 60 including actual representative point reference information 61 and actual boundary line reference information 62 as ground truth information.

The accuracy of segmentation is a boundary line between the representative point, which is the start of the cluster, and another area, so that the segmentation artificial neural network module 150 of the present invention may respectively or simultaneously perform training on the representative point and the boundary line.

Specifically, the loss function of the segmentation artificial neural network module 150 may include a representative point loss function and a boundary line loss function, and in this case, the representative point loss function means a difference between the representative point information 51 corresponding to a center point of the inferred boarding possible area and the representative point reference information 61 corresponding to a center point of the actual boarding possible area, the boundary line loss function means a difference between the boundary line information 52 corresponding to a boundary line of the inferred boarding possible area and the boundary line reference information 62 corresponding to the boundary line information 62 of the actual boarding possible area, and the segmentation artificial neural network module 150 may update the parameter of the segmentation artificial neural network module 150 so that a value of a total loss function, which is a sum of the representative point loss function and the boundary line loss function, is reduced.

In FIG. 11, the loss function has been described based on the sum of the representative point loss function and the boundary line loss function, but the segmentation artificial neural network module 150 may perform training based on only the representative point loss function or the boundary line loss function.

When described with reference to FIG. 12, FIG. 12 (*a*) is the image segmentation information 50 (reliability not shown) outputted from the segmentation artificial neural network module 150, FIG. 12 (*b*) is a drawing in which an area segmented into a boarding possible area in the image segmentation information 50 is displayed on an actual image, and FIG. 12 (*c*) is an actual image serving to be the reference information.

The segmentation artificial neural network module 150 generates coordinate information based on a center point C1 of the inferred boarding possible area as described above, and also generates coordinate information with respect to a center point C2 of the actual boarding possible area, and then may perform training on the central point so that the value between the generated pieces of coordinate information is minimized, or may perform training in a direction in which C1 coincides with C2 based on C2.

Similarly, the segmentation artificial neural network module 150 generates the boundary line information based on a boundary line L1 of the boarding possible area, and generates the boundary line information with respect to a boundary line L2 of the actual boarding possible area, and then may perform training on the central point so that the value between the generated pieces of information is minimized, or may perform training in a direction in which L1 coincides with L2 based on L2.

Figure 13:
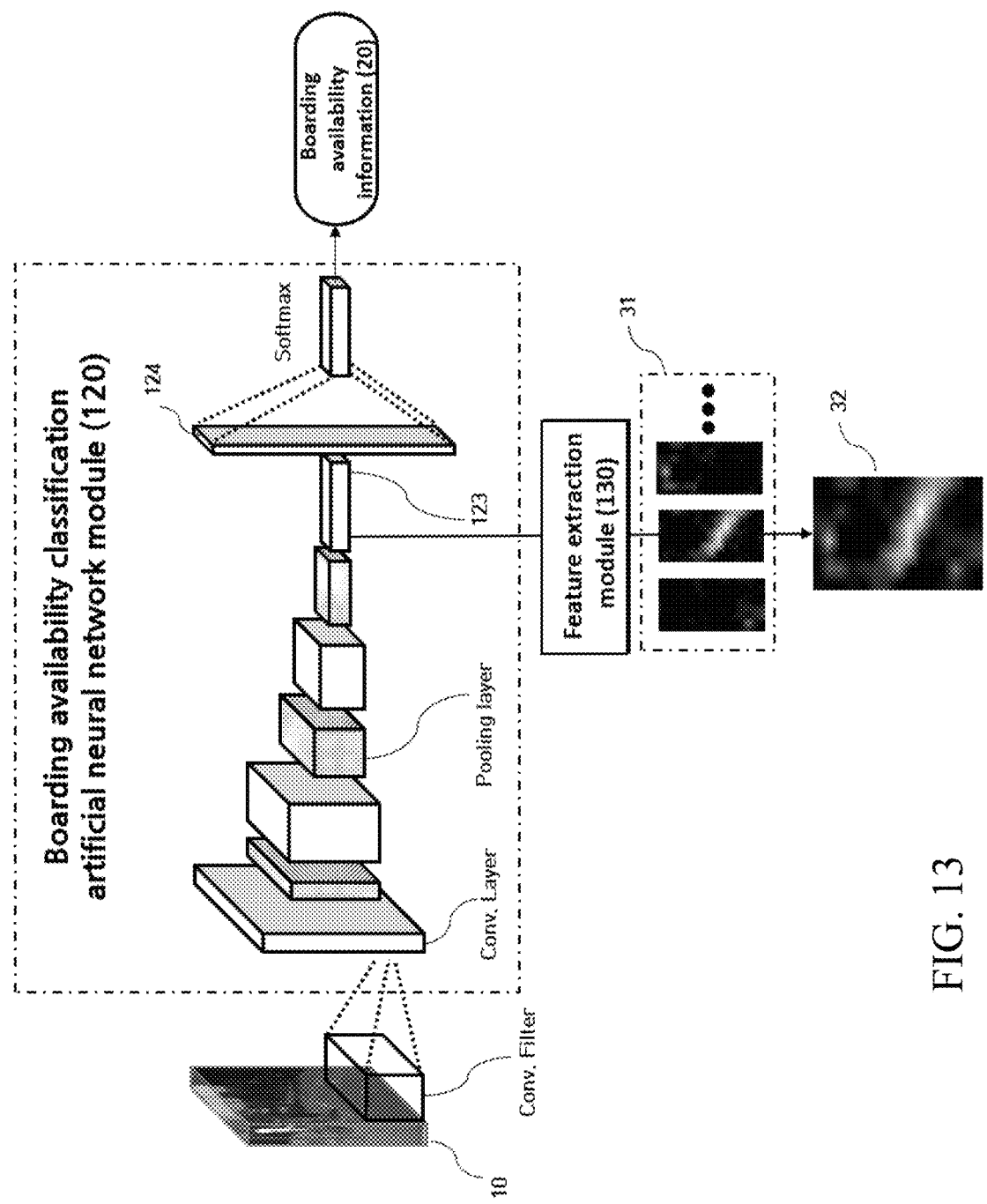
FIG. 13 is a schematic view illustrating integrated activation map generation of a feature extraction module according to another embodiment of the present invention.

In relation to the activation map extraction of the feature extraction module 130, FIG. 13 is a schematic view illustrating integrated activation map generation of a feature extraction module 130 according to another embodiment of the present invention. As shown in FIG. 13, the feature extraction module 130 according to another embodiment of the present invention may extract a plurality of nulling activation maps 31 from the boarding availability classification artificial neural network module 120 to generate one activation map 30 by integrating the extracted plurality of nulling activation maps 31.

The nulling activation map 31 refers to an activation map outputted by applying nulling to a part of a convolution filter (Conv. Filter) of the boarding availability classification artificial neural network module 120. That is, generally, in extracting an activation map by using a filter, it means that a filter to which nulling is applied is used, and the meaning of applying nulling to the filter means that a feature is randomly set to 0 in a partial area of the filter.

Accordingly, after applying nulling to a part of the convolution filter (Conv. Filter) of the boarding availability classification artificial neural network module 120, the activation map extracted by the feature extraction module 130 from the Conv.Layer before the fully connected layer (FC) of the boarding availability classification artificial neural network module 120 for training the artificial neural network module so that the loss between the boarding availability information 20 outputted from the output layer of the boarding availability classification artificial neural network module 120 and the actual boarding availability information that is the ground truth decreases, may be defined as the nulling activation map, and accordingly, the nulling activation map may be the activation map 31 having different vector values.

Figure 14:
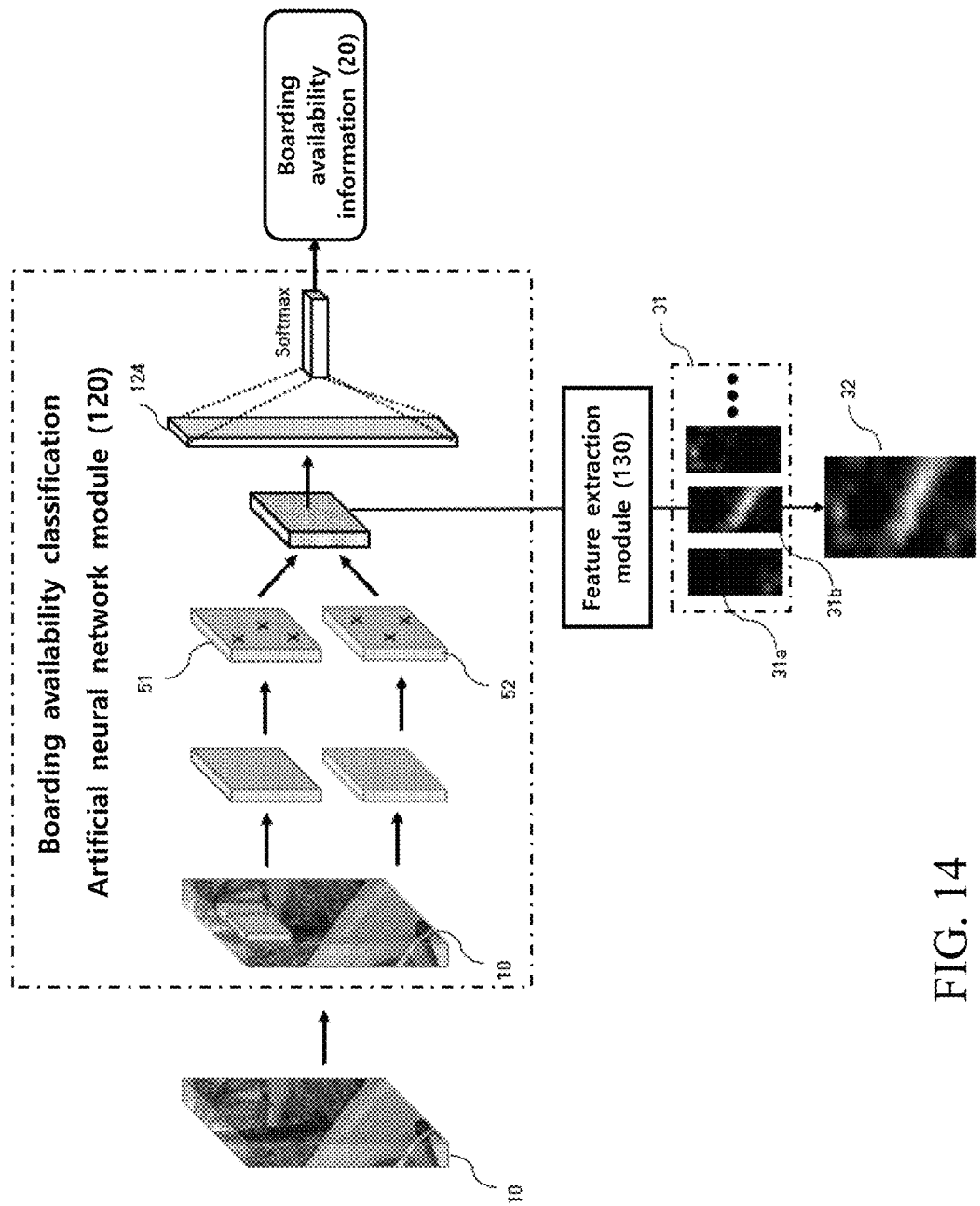
FIG. 14 and FIG. 15 are schematic views illustrating generation of the nulling activation map according to another embodiment of the present invention.
Figure 15:
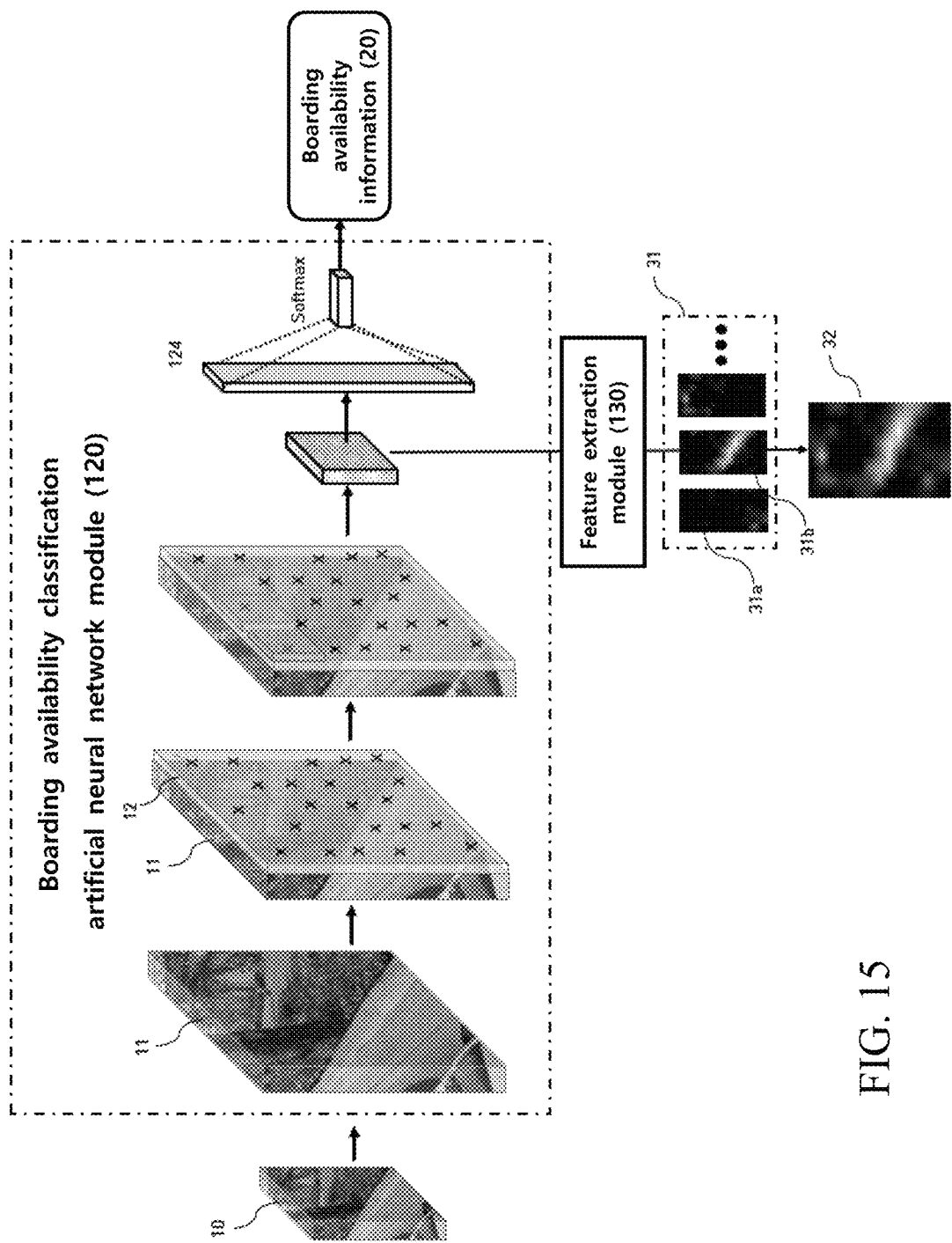

In detail with respect to the method of generating the nulling activation map 31, FIG. 14 and FIG. 15 are schematic views illustrating generation of the nulling activation map according to another embodiment of the present invention.

In the case of FIG. 14, in relation to the nulling method, a convolution operation may be performed by a method in which a stride of the convolution filter is set to 1 and in which a random selection in which nulling is randomly applied to the convolution filter whenever window sliding is applied (a portion marked with an x in the drawing is a portion in which nulling is applied) is applied. In the performing of the convolution operation by applying the nulling to the random selection, the portion that is nulled in the filter is not fixed, but the portion that is nulled in the filter is randomly changed whenever a sliding window is performed.

As an example, when the filter initially performs the window sliding, as indicated by x in the red filter 51, the convolution operation is performed based on the filter to which the random selection is applied, and thereafter, as indicated by x in the blue filter 52, the convolution operation is performed based on the filter to which the random selection is applied. In other words, it means that when sliding the feature map with a filter, the feature is randomly selected for each slide window.

Accordingly, it is possible to extract a first nulling activation map 31a by applying nulling in a form of a red filter to the convolution filter (Conv. Filter) of the boarding availability classification artificial neural network module 120, and it is possible to extract a second nulling activation map 31b by applying nulling in a form of a blue filter to the convolution filter (Conv. Filter) of the boarding availability classification artificial neural network module 120. Accordingly, when these steps are repeated, the feature extraction module 130 may extract a plurality of nulling activation maps 31.

In performing the convolution operation, as another embodiment of the present invention, as shown in FIG. 15, after applying the random selection feature map 12 to an enlarged image strip 11 in which the image strips 10 is enlarged, a convolution operation may be performed based on this. In FIG. 15, the enlarged image strips 11 refers to an image strip enlarged by multiplying a size of the input image strip 10 by 's', which is a number of stride applied in the performing of the convolution operation.

Compared with FIG. 14, in the case of FIG. 14, the random selection is performed on the filter itself (in FIG. 14, the stride is 1) while sliding the filter in performing the convolution operation, while in FIG. 15, after applying the random selection feature map 12 corresponding to the size of the enlarged image strip 11 to the enlarged image strip 11 (the portion marked with x in FIG. 15 shows a state in which the random selection is applied), the convolution operation may be performed on the applied image.

That is, in FIG. 14, the random selection is applied while the filter performs the sliding window with respect to the image strip 10, while in FIG. 15, instead of doing so, a pre-randomly selected feature may be enlarged to match the size of the image strip 10, and then the convolution operation may be performed by using the filter.

Accordingly, in the case of FIG. 15, after applying nulling to a portion of the convolution layer (Conv. Filter) of the boarding availability classification artificial neural network module 120, it may train the artificial neural network module so that the loss between the boarding availability information 20 outputted from the output layer of the boarding availability classification artificial neural network module 120 and the actual boarding availability information that is the ground truth decreases, may be defined as the nulling activation map, and accordingly, the nulling activation map may be the activation map 31 having different vector values, and the feature extraction module 130 may extract the activation map from the Conv. Layer before the fully connected layer (FC).

When the convolution operation is performed in the same way as in FIG. 15, the extracted result is the same as in the case of FIG. 14, but there is no need to perform the random selection while sliding, and it is possible to perform convolution operation in which the random selection is applied to the entire enlarged image at once, so that it is possible to generate the nulling activation map 31 faster than the method in FIG. 14. That is, in the case of FIG. 14, the sliding window should be randomly extracted while performing the convolution, and when this is implemented with a separate processor, although it is difficult to implement this in a common deep training framework (for example, pytorch or tensorflow), while when the convolution is performed in the same way as in FIG. 15, the convolution operation applied with random selection may be relatively quickly performed, so that an entire process of a processor may be shortened.

In addition, although not shown in the drawings, in the present invention, when drop-out is applied to the extracted feature map after performing the convolution, instead of a general drop-out method, the drop-out may be applied in a way in which a feature corresponding to a center of each sliding window is not removed by the drop-out. In the case of using the general drop-out, since there is a drawback that it is difficult to grasp a correlation between respective sliding windows, when the artificial neural network performs training, spatial information is mixed, so efficiency thereof may deteriorate. However, when the drop-out is performed with the existing method for the feature corresponding to the center thereof, the information about the center thereof is preserved, so that the artificial neural network module may normally perform training based on spatial information when performing the training.

Figure 16:
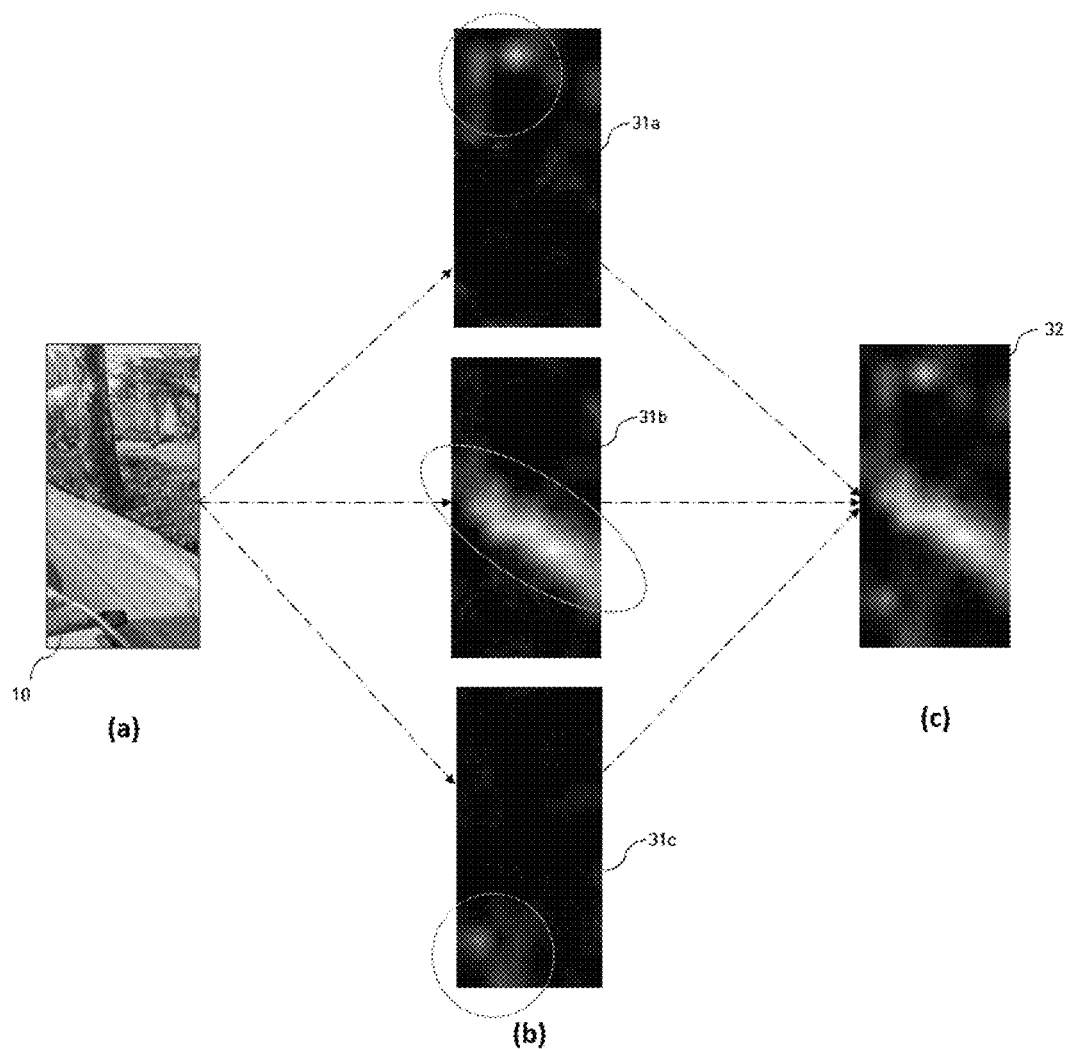
FIG. 16 is a schematic view showing generation of the integrated activation map according to another embodiment of the present invention.

An integrated activation map 32 refers to an activation map in which a plurality of nulling activation maps 31 extracted from the feature extraction module 130 are integrated into one matrix. FIG. 16 is a schematic view showing generation of the integrated activation map 32 according to another embodiment of the present invention. As shown in FIG. 16, the feature extraction module 130 may be configured to generate the integrated activation map 32 by integrating a plurality of extracted nulling activation maps 31 into one matrix.

The integrated activation map 32 generated in this way is inputted to the area information generation module 140, as described above with reference to FIG. 5, the area information generation module 140 may determine the boarding possible area on the image strip 10 based on the information on the area for the obstacles included in the integrated activation map 32 and the other area, and may display the determined boarding possible area information 40 as a separate area on the image strip 10.

As another embodiment, the area information generation module 140, as shown in FIG. 8, may determine the boarding possible area by using the image segmentation information 50 for the integrated activation map 32 extracted by the feature extraction module 130, and may display the determined boarding possible area information 40 as a separate area on the image strip 10. The method for the area information generation module 140 to determine the boarding possible area by using the image segmentation information 50 has been previously described in detail, so it will be omitted below.

Figure 17:
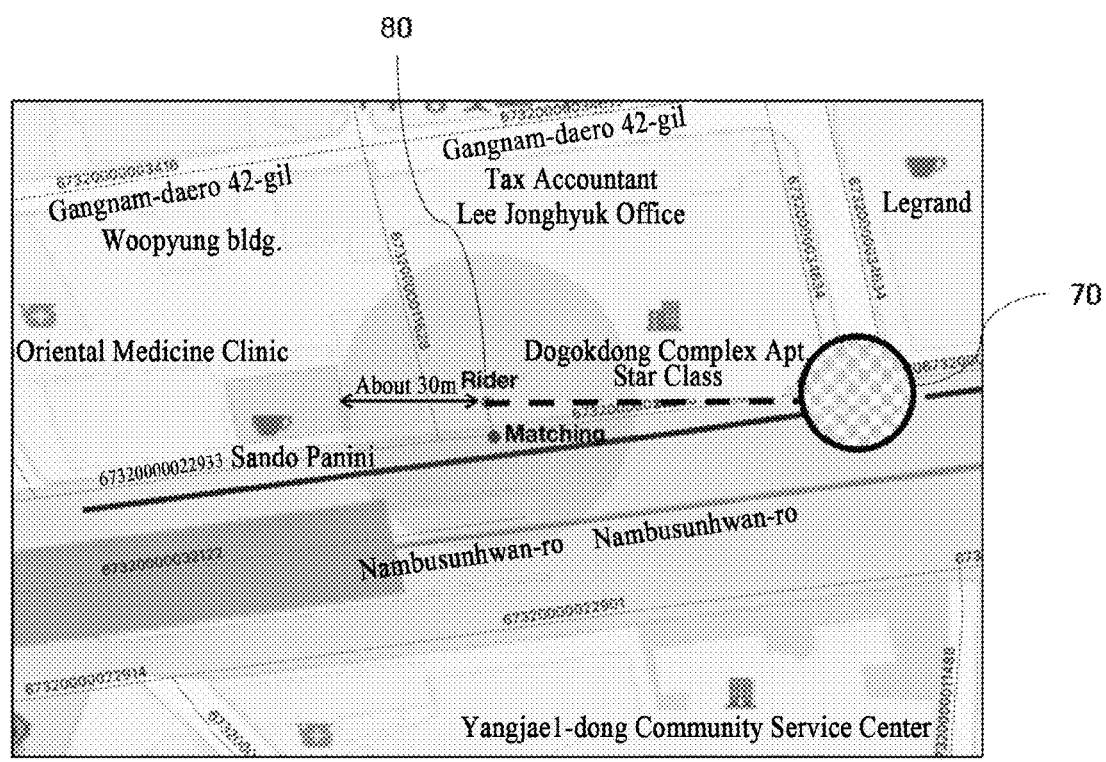
FIG. 17 is a drawing showing an example in which boarding possible area information is displayed on a map according to an embodiment of the present invention.

FIG. 17 is a drawing showing an example in which boarding possible area information is displayed on a map according to an embodiment of the present invention.

The present invention may provide the user with information on the closest boarding possible area based on the user's current location by mapping the information on the boarding possible area on the road generated based on the vehicle driving image to the map.

Specifically, the area information generation module 140 may generate boarding possible area information 70 by mapping the coordinate information of the boarding possible area information 40 on the map based on the boarding possible area information 40 and the current location information and driving direction information in the driving image.

Accordingly, the vehicle boarding possible area determination apparatus 100 according to the embodiment of the present invention may determine the current location of the user terminal through the application module installed in the user terminal, and may control the application module installed in the user terminal so that the closest boarding possible area information 70 based on the current location of the user terminal may be displayed on the map of the user terminal application module.

For example, when the current user's location is determined to be the location indicated by reference numeral 80 of FIG. 17 through the user terminal, the vehicle boarding possible area determination apparatus 100 may control the application module so that the boarding possible area information 70 closest to the user terminal is displayed on map of the application module installed in the user terminal as shown in FIG. 17.

According to this, when the user call a taxi based on the boarding possible area information 70 in a case of calling the taxi, or when the user needs to board a vehicle of an acquaintance, the location of the boarding possible area information 70 may be transmitted to the driver, so that it is possible to more safely get in the vehicle.

So far, the method and apparatus for determining the vehicle boarding possible area for the driving image using the artificial neural network according to the embodiment have been described in detail.

Since the method and apparatus for determining the vehicle boarding possible area for the driving image using the artificial neural network according to the embodiment provides information on a vehicle boarding possible area on a current road to a driver of a vehicle or a pedestrian, the pedestrian can safely board the vehicle.

In addition, in providing information on a vehicle boarding possible area, in the prior art, it is manually performed by a person, while in the present invention, information on a boarding possible area in front of a currently driving vehicle can be generated in an automated manner by using an artificial neural network, so that it is possible to more safely and accurately provide boarding possible area information.

In addition, it is possible to accurately know a location of the boarding possible area according to this, so that a waiting time for a call taxi service may be remarkably reduced.

In addition, when a map including boarding possible area information is created, in the prior art, it is necessary to manually label a boarding possible area on the map, while in the present invention, it is possible to automatically create boarding possible area information based on an obtained driving image, so that it is possible to more easily create a map including the boarding possible area information.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. An apparatus for determining a vehicle boarding possible area for a driving image using an artificial neural network, comprising:
  a processor configured to:
    obtain a driving image for a driving direction of a vehicle from a camera,
    segment the driving image into a plurality of image strips,
    extract an activation map including feature information in the image strip,
    generate image segmentation information on the image strip; and
    generate boarding possible area information for the image strip based on the feature information included in the activation map and the image segmentation information.

2. The apparatus for determining the vehicle boarding possible area for the driving image using the artificial neural network of claim 1, wherein the processor is further configured to generate a corrected activation map by utilizing reliability information for each coordinate included in the image segmentation information based on a representative point of the activation map, and to generate boarding possible area information for the image strip based on the corrected activation map.

3. The apparatus for determining the vehicle boarding possible area for the driving image using the artificial neural network of claim 1, wherein
  a loss of a segmentation artificial neural network for generating the image segmentation information includes a representative point loss that is a distance difference between representative point information in reference information for the image strip and representative point information in the image segmentation information, and a boundary line loss that is a distance difference between boundary line information in reference information for the image strip and boundary line information in the image segmentation information, and the segmentation artificial neural network performs training so as to reduce a loss of the segmentation artificial neural network.

4. The apparatus for determining the vehicle boarding possible area for the driving image using the artificial neural network of claim 1, wherein the processor is further configured to segment the driving image so that the image strip becomes a rectangular image strip having a vertical length thereof to be longer than a horizontal length thereof.

5. A method for determining a vehicle boarding possible area for a driving image using an artificial neural network, comprising:

obtaining a driving image for a driving direction of a vehicle from a camera;

segmenting the driving image into a plurality of image strips;

extracting an activation map including feature information in the image strip;

generating image segmentation information on the image strip; and generating boarding possible area information for the image strip based on the feature information included in the activation map and the image segmentation information.

* * * * *